3,236,661
ORGANIC DISPERSIONS
Arthur S. Teot, Midland, Mich., assignor to The Dow Chemical Company, Midland, Mich., a corporation of Delaware
No Drawing. Filed May 12, 1961, Ser. No. 109,510
8 Claims. (Cl. 106—23)

The present invention relates to a new and useful method of dispersing solids in organic media which (organic media) are not solvents for the solids. More particularly, the present invention relates to dispersion of pigments and other solids in organic media.

Recent developments in dispersing agents have materially reduced the mechanical power requirements necessary to disperse solids in organic media, such as, for example, dispersion of opaquing pigments and the like into paint and varnish vehicles, printing ink vehicles, and the like. Many of the known dispersing agents give excellent results in specific applications but are of limited operability in the major portion of applications wherein solid opaquing and/or coloring materials are required to be dispersed into organic media. Thus, for example, many dispersing agents useful in dispersing one class of solids in organic media are not useful for dispersing another class of solids in the same media, and likewise a dispersing agent for dispersing one class of solids in a particular solvent medium is not useful for dispersing the same class of solids in another solvent system. Other problems are represented by the attempts to disperse hydrophilic solids in hydrophobic (oleophilic) media. There are very few dispersing agents for this latter type of dispersion. The problems attendant to dispersion in general are many and varied and the discovery of a dispersing agent having wider application in organic media for both hydrophilic and oleophilic solids would be highly desirable.

It is, therefore, and object of the present invention to provide a method for dispersing most pigments and other solids in a wide variety of organic media. It is a further object of the present invention to provide a method for dispersing pigments and other solids wherein the dispersant employed is stable under the severe conditions encountered in the many applications of the dispersion. These and other objects will become apparent to those skilled in the art to which the invention pertains.

It has now been found that an alkylated halogenated diphenyl oxide sulfonic acid or its salt (i.e., a diphenyl oxide which can be nuclearly halogenated on one or both of the phenylene radicals, mono- or dialkylated and monosulfonated) when employed in an amount from 0.01 percent to 33.3 percent by weight based on the pigment or solid to be dispersed, produces a micro-dispersion of the solid. The class of compounds which has been found to be useful in accordance with the present invention is that consisting of the diphenyl oxides having the following general formula

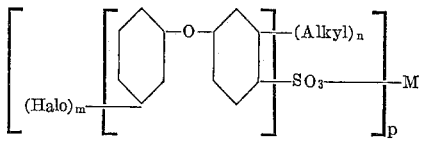

wherein the alkyl radical has from 8 to 18 carbon atoms, inclusive; the symbol "halo" represents a halogen atom having an atomic number from 17 to 35, the symbol $n$ represents an integer from 1 to 2, the symbol $m$ represents an integer from 0 to 2, inclusive; the symbol M represents a metal selected from the group consisting of alkali and alkaline earth metals, $p$ represents an integer equal to the valence of the metal M.

Representative of the above described dispersants which can be employed in accordance with the present invention, are the alkaline earth metal salts of alkylated monosulfonates such as, for example, the barium di(mononylmonochlorodiphenyl oxide sulfonate), barium di(monoheptadecyldichlorodiphenyl oxide sulfonate), barium di(didodecylmonochlorodiphenyl oxide sulfonate), barium di(monooctyldiphenyl oxide sulfonate); and the monovalent metal salts, as for example, sodium, potassium, lithium, rubidium and cesium which can be represented, for purposes of illustration only, by sodium monooctylmonochlorodiphenyl oxide sulfonate, sodium (monododecyldiphenyl oxide sulfonate), sodium (dioctyldichlorodiphenyl oxide sulfonate), and the like.

The above described materials can be employed as the dispersant in most organic vehicle base compositions as, for example, typographic printing ink compositions composed principally of linseed oil and a pigment; steam-setting inks based on diethylene glycol in place of linseed oil; pigmented lubricating oil-base printing compositions; paints containing as the organic resins, i.e., styrenated drying oils, and the like, the natural and synthetic drying oils such as the ester of long-chain, polyunsaturated fatty acids, dehydrated castor oil and the like, to name only a few representative of the varied applications of the present invention.

The above list of media in which the method of the present application is operable is only representative of the many types of non-aqueous organic media, including resins and polymers, in which pigment or solid is dispersed to obtain opaque and/or colored compositions employed in industry and is intended to illustrate only the diverse nature of the applicability of the compositions and methods hereinafter described in detail.

It is to be understood that any pigment or opaquing agent can be more adequately dispersed in an organic media employing the dispersants of the present invention. Thus, one can disperse the inorganic pigments such as lead chromate, carbon black, zinc oxide, titanium dioxide, iron oxide, calcium carbonate, as well as the organic pigments or opaquing agents such as the phthalocyanines, as, for example, copper phthalocyanine, the lakes such as F.C.F. blue lake, aluminum stearate and the like, the clays such as kaolin and the like to name only a few.

The following examples illustrate the present invention but are not to be construed as limiting.

*Example 1*

The following examples illustrate the dispersing power of the dispersants of the present invention in a various organic media of inorganic pigments.

*General procedure.*—Barium di(octylchlorodiphenyl oxide monosulfonate), 0.5 gram, was dissolved in 39.5 grams of organic media, e.g. linseed oil (usually mild heating is required to make the dissolution occur in a short time). After cooling, this solution was placed in a 100 milliliter glass-stoppered graduate. 10 grams of a pigment, e.g., titanium dioxide, was then weighed into the graduate. This was mixed by inverting the graduate, being careful to allow time for most of the oil film to flow down the sides of the graduate before reinverting. This procedure was repeated 20 times; then the graduate was observed for rate of settling. The results of observations made after the indicated intervals is recorded below. A control containing no dispersing agent was observed in each instance and the results of such observations recorded.

TABLE I

| Dispersant | Pigment | Organic Media | Appearance, cc. clear oil layer on top after indicated hours |
|---|---|---|---|
| 1. Barium di(octylchlorodiphenyl oxide monosulfonate. | TiO$_2$ | Linseed oil | 1 cc.—18 hours. |
| 2. None | TiO$_2$ | ___do___ | 32 cc.—4 hours. |
| 3. Sodium dodecyl diphenyl oxide monosulfonate. | ZnO | ___do___ | {2 cc.—6 hours. {11 cc.—23 hours. |
| 4. None | ZnO | ___do___ | {10 cc.—6 hours. {25 cc.—23 hours. |
| 5. Barium di(octylchlorodiphenyl oxide monosulfonate). | Carbon Black | Diethylene glycol | 8 cc.—19.5 hours. |
| 6. None | ___do___ | ___do___ | 13 cc.—19.5 hours. |
| 7. Sodium dodecyldiphenyl oxide monosulfonate. | TiO$_2$ | ___do___ | 13 cc.—25-26 hours. |
| 8. None | TiO$_2$ | ___do___ | 23 cc.—25-26 hours. |
| 9. Barium dioctyl monochlorodiphenyl oxide dimonosulfonate. | Carbon Black | Kerosene | 17 cc.—1 hour. |
| 10. None | ___do___ | ___do___ | 30 cc.—1 hour. |
| 11. Sodium dodecyl monochlorodiphenyl oxide monosulfonate. | TiO$_2$ | ___do___ | 10 cc.—70.5 hours. |
| 12. None | TiO$_2$ | ___do___ | 32 cc. in 2 minutes. |
| 13. Sodium dodecyl monochlorodiphenyl oxide monosulfonate. | TiO$_2$ | Ethyl Benzene | 5 cc.—16 hours. |
| 14. None | TiO$_2$ | ___do___ | 20 cc.—54 seconds. |

The following examples illustrate viscosity reduction of concentrated pigment slurries when small amounts of a dispersant are employed in accordance with the present invention.

*Example 15*

A slurry of 44% carbon black (Sterling M.T.) in ethylbenzene was placed in the cup of a Stormer viscosimeter, a 300 gram weight was attached to the pulley system of the viscosimeter and the time for one revolution of the dial was recorded. Sodium dodecylmonochlorodiphenyl oxide sulfonate in the indicated amount was added to the viscosimeter cup, the solution was mixed by rotating the spindle and the time for one revolution again recorded. The same procedure was repeated for further dispersant additions. The results of this test are listed below:

Dispersant, percent by weight: Viscosimeter time (seconds)
No dispersant _____ 138
0.04 _____ 7
0.08 _____ 6
0.16 _____ 5.5

*Example 16*

A slurry of 22% titanium dioxide in mineral oil was prepared and the viscosity measured in a Stormer viscosimeter as described above.

Dispersant: Viscosimeter time (seconds)
No dispersant _____ 10.4
0.04% sodium dodecylmonochlorodiphenyl oxide monosulfonate _____ 8.5
0.08% sodium dodecylmonochlorodiphenyl oxide monosulfonate _____ 4.4

*Example 17*

This example illustrates the ability of sodium dodecylmonochlorodiphenyl oxide sulfonate to disperse calcium carbonate in kerosene. The CaCO$_3$ concentration was 50% by weight and the Stormer viscosimeter was again used to make the viscosity measurements. The following data were obtained.

Dispersant, percent by weight: Viscosimeter time (seconds)
No dispersant _____ 124
0.04 _____ 80
0.13 _____ 7.4
0.15 _____ 6.8

*Example 18*

This dispersion contained 28.6% cadmium sulfide in dibutyl phthalate and the evaluation was carried out in the usual manner with various amounts of dispersant added and the viscosimeter time recorded.

Dispersant, by weight: Viscosimeter time (seconds)
No dispersant _____ 10.0
0.1% sodium dodecylmonochlorodiphenyl oxide sulfonate _____ 5.2
0.12% sodium dodecylmonochlorodiphenyl oxide sulfonate _____ 4.2
0.2% sodium dodecylmonochlorodiphenyl oxide sulfonate _____ 4.2

*Example 19*

The dispersant properties of sodium dodecylmonochlorodiphenyl oxide sulfonate are set forth below for a slurry containing 36.4 weight percent ZnO in kerosene.

| Dispersant, percent by weight | Viscosimeter Weight, Grams | Viscosimeter Time (seconds) |
|---|---|---|
| No dispersant | 1,200 | 43.0 |
| 0.07 | 600 | 17.5 |
| 0.16 | 300 | 4.8 |

In polyethylene satisfactory dispersion of the pigment in the plastic is very difficult and at present is accomplished only by mixing the pigment and polyethylene in a Banbury mixer for an extended period of time. It would be highly advantageous if a good dispersion could be obtained by utilizing only the mixing action of an extruder. The following example shows the effect of a dispersant of the present invention in pigmented plastic compositions.

*Example 20*

Two pounds of TiO$_2$ were dry blended with 0, 0.1 lb., 0.2 lb., and 0.4 lb. respectively of sodium dodecylmonochlorodiphenyl oxide sulfonate in a large Waring Blendor for about 15 minutes. Each dry blend was rolled in a 5 gallon glass bottle for 30 minutes with 10 pounds of polyethylene pellets. The pigment-coated pellets were extruded; the strand air-cooled; and repelletized with a rotary knife blade. The extruder temperature was adjusted on each run for optimum operation of the machine; the lower temperatures indicate more complete dispersions and mixing of the pigment with polyethylene.

| Dispersant, percent by weight based on pigment: | Extrusion temperature, °F. |
|---|---|
| 20 | 260 |
| 10 | 285 |
| 5 | 330 |
| 0 | 330 |

The following example illustrates the ability of the dispersants of the present invention in improving a black printing ink to be used on rotogravure presses.

*Example 21*

FORMULATION

| | | |
|---|---|---|
| Phenol-formaldehyde resins | grams | 20 (4%) |
| Ethocel (standard, 10 cps.) | do | 30 (6%) |
| Asphalt | do | 60 (12%) |
| Carbon black (Peerless pellets) | do | 60 (12%) |
| Sodium dodecyl monochlorodiphenyl oxide sulfonate | do | .5 (.1%) |
| Kaolin | do | 17.5 (3.5%) |
| Ethyl acetate | do | 56.5 (11.3%) |
| Petroleum thinner | do | 255.5 (50.7%) |

The phenol-formaldehyde resin and petroleum solvent were heated in an open vessel to dissolve the resin, the Ethocel added and also heated to dissolve. While the solution was still hot, the dispersing agent and the asphalt were dissolved therein. The solution was poured into a small ball mill, the carbon black and kaolin were added and the ball mill was rolled 48 hours. The ethyl acetate was then incorporated and the mill rolled an additional hour. The viscosity of the finished ink formulation was 44 cps.

The ink was transferred to the fountain of a small laboratory rotogravure press and a printing operation carried out. The printing was sharp and black (a reflectance of 3 photovolt units) and the gloss of this film measured at 60° was 14%. The ink dried rapidly and when rubbed lightly with a piece of white paper gave a hardly discernible black smear.

I claim:

1. A method for dispersing solid pigment and opaquing materials in a non-solvent organic liquid medium which consisting essentially of mixing with said organic medium and said solid, an effective amount of from 0.01 to 33.3% by weight based on the solid of an alkylated diphenyl oxide sulfonate dispersant having the formula

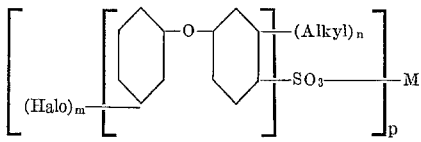

wherein the alkyl radical has from 8 to 18 carbon atoms, inclusive; the symbol "halo" represents a halogen atom having an atomic number from 17 to 35, $m$ represents an integer from 0 to 2, $n$ represents an integer from 1 to 2, M represents a metal selected from the group consisting of alkali and alkaline earth metals, $p$ represents the valence of the metal M.

2. The method of claim 1 wherein the liquid medium is a paint vehicle.

3. The method of claim 1 wherein the liquid medium is a drying oil.

4. The method of claim 1 wherein the liquid medium comprises an organic resin.

5. The method of claim 1 wherein the liquid medium comprises a printing ink.

6. The method of claim 5 wherein said printing ink is a resin based ink and the resin is polystyrene.

7. The method of claim 5 wherein said printing ink is a resin based ink and the resin is polyethylene.

8. The method of claim 1 wherein said dispersant is sodium dodecyldiphenyl oxide sulfonate.

References Cited by the Examiner

UNITED STATES PATENTS

| 2,530,370 | 11/1950 | Auger | 106—252 |
| 2,754,218 | 7/1956 | Magie | 106—22 |
| 2,854,477 | 9/1958 | Steinhauer | 260—512 |
| 2,955,096 | 10/1960 | White | 260—33.6 |
| 2,992,999 | 7/1961 | Smith et al. | 260—512 XR |

OTHER REFERENCES

The Condensed Chemical Dictionary, sixth edition, Reinhold Publishing Corporation, New York (page 344, "detergent" and "detergent, synthetic" relied upon).

ALEXANDER H. BRODMERKEL, *Primary Examiner.*

JOHN R. SPECK, MORRIS LIEBMAN, *Examiners.*